United States Patent
Fink et al.

(10) Patent No.: US 7,964,255 B2
(45) Date of Patent: Jun. 21, 2011

(54) HEAT-SHRINKABLE MULTILAYER MATERIAL

(75) Inventors: Bernhard Fink, Vienna (AT); Michael Krainz, Vienna (AT); Michael Washuettl, Vienna (AT)

(73) Assignee: Micro Shaping, Ltd., Worthing, West Sussex (GB)

( * ) Notice: Subject to any disclaimer, the term of this patent is extended or adjusted under 35 U.S.C. 154(b) by 808 days.

(21) Appl. No.: 11/973,164

(22) Filed: Oct. 4, 2007

(65) Prior Publication Data

US 2008/0233320 A1    Sep. 25, 2008

Related U.S. Application Data

(63) Continuation-in-part of application No. 10/311,481, filed as application No. PCT/GB01/02643 on Jun. 15, 2001, now abandoned.

(30) Foreign Application Priority Data

Jun. 16, 2000  (GB) .................................. 0014852.8

(51) Int. Cl.
*B65B 53/00* (2006.01)
*B32B 3/00* (2006.01)
*B65D 81/34* (2006.01)
*B29C 65/00* (2006.01)

(52) U.S. Cl. ........ 428/34.9; 426/107; 428/189; 156/292

(58) Field of Classification Search .................. 428/34.9, 428/189; 156/273.3, 292; 426/107
See application file for complete search history.

(56) References Cited

U.S. PATENT DOCUMENTS

| | | |
|---|---|---|
| 3,716,606 A | 2/1973 | Bazett |
| 3,764,453 A | 10/1973 | Ropiequet and Montag |
| 3,874,966 A | 4/1975 | Garcia |
| 4,207,730 A | 6/1980 | Lorenz |
| 4,283,427 A | 8/1981 | Winters et al. |
| 4,324,245 A | 4/1982 | Mesek et al. |
| 4,655,760 A | 4/1987 | Morman et al. |
| 4,884,717 A * | 12/1989 | Bussard et al. ............... 220/229 |
| 4,957,787 A | 9/1990 | Reinhardt et al. |
| 4,985,300 A * | 1/1991 | Huang ........................... 428/332 |
| 5,170,025 A * | 12/1992 | Perry ............................ 219/759 |
| 5,916,203 A | 6/1999 | Brandon et al. |
| 6,623,821 B1 * | 9/2003 | Kendig ........................ 428/34.9 |

FOREIGN PATENT DOCUMENTS

WO    WO 96 13434 A    9/1996

OTHER PUBLICATIONS http://dictionary.reference.com/browse/bag 2010.*

* cited by examiner

*Primary Examiner* — Rena L Dye
*Assistant Examiner* — Erik Kashnikow
(74) *Attorney, Agent, or Firm* — Klarquist Sparkman, LLP

(57) ABSTRACT

A heat-shrinkable multilayer material for packaging, in particular food packaging, comprises a first layer made of heat-shrinkable material, a microwave susceptible material covering at least a part of the first layer, at least one second layer made of shrinkable or non-shrinkable material, the first and second layer can be connected to each other by embedding the microwave susceptible material, wherein the microwave susceptible material is arranged in a pattern between the first and second layer, the pattern creating areas of increased stiffness within the multilayer material when microwave energy is applied onto.

24 Claims, 3 Drawing Sheets

HEAT-SHRINKABLE MULTILAYER MATERIAL

CROSS REFERENCE TO RELATED APPLICATION

The present application is a continuation-in-part of U.S. patent application Ser. No. 10/311,481 filed on Dec. 16, 2002 now abandoned, which is the U.S. National Stage of PCT/GB01/02643, filed on Jun. 15, 2001, which claims priority from GB 0014852.8 filed on Jun. 16, 2000. These applications are incorporated herein by reference.

FIELD

The present application relates to a heat-shrinkable multilayer material for packaging, in particular for food packaging. The present application also relates to a food bag made of a heat-shrinkable multilayer material.

BACKGROUND

It has been known for many years that plastic materials may be shaped by heating the material to a temperature at which it may be easily deformed, and then bending or otherwise shaping the material into the desired configuration. It has also been known that pre-stretched plastics have a particular response to heating. When pre-stretched plastic materials are heated above their deformation temperature, the material is known to shrink in size.

One of the known ways for heating plastic material in order to shrink it is to expose the plastic material to microwave radiation. For this purpose, the plastic material has to come in contact with a microwave susceptible material. The microwave susceptible material is heated up when exposed to microwave energy and transfers this heat to the plastic material.

U.S. Pat. No. 4,985,300 discloses a heat shrinkable film useful for packaging and for cooking in a microwave oven of at least one food item which requires surface browning or crisping, comprising at least one layer of flexible, heat resistant, microwave transparent base film, which is shrinkable, and a transmissive layer of microwave susceptor material extending over the base film. The film is suitable for browning or crisping of a food item placed adjacent thereto. Under the influence of microwave radiation the packaging material shrinks to the size of the food item wrapped into the packaging material and transfers its heat to the food in order to create a brown or crispy surface on the food item. The packaging material, after being exposed to microwave energy, is generally discarded and not used, for example, as a bin for serving the food. The hot food item is typically unwrapped, i.e. the shrunken packaging material is removed, prior to serving of the food item.

SUMMARY

It is therefore an object of this disclosure to describe a multilayer heat-shrinkable material for packaging, which may be used as a serving or storage means.

According to a first aspect, a heat-shrinkable multilayer material for packaging is provided, the multilayer material comprising a first layer made of heat-shrinkable material, a microwave susceptible material covering at least a part of the heat-shrinkable material, at least one second layer made of shrinkable or non-shrinkable material, and the first and second layer can be connected to each other by embedding the microwave susceptible material, wherein the microwave susceptible material is arranged in a pattern between the first and second layer and the pattern creates areas of increased stiffness within the multilayer material when microwave energy is applied to the multilayer material.

Suitable plastic materials which may be used as a first heat-shrinkable layer of the multilayer material are commonly available. Preferably, the first heat-shrinkable layer is a plastic material such as a polymer with the following properties: high temperature resistance (i.e. shrinkage begins to occur at about 100° C.), a minimum of about 10% and up to about 100% shrinkage upon heating, good stiffness, high microwave transparency, no emission of harmful substances when overheated, and sealable. The plastic material is optionally approved for food contact. Advantageously, the first layer is a pre-stretched material such as pre-stretched polyethylene terephthalate which typically has the above mentioned properties. Another suitable material is polypropylene.

The second layer may be made of the same material as the first layer and therefore be heat-shrinkable as well, but it is also within the scope of this disclosure that the second layer is made of a different material. In particular, the second layer may be made of a non-shrinkable material. In this case, the non-shrinkable plastic material can be a polymer with the following properties: high temperature resistance (i.e. shrinkage occurs at about 200° C. and above), shrinkage of less than about 2%, high stiffness, high microwave transparency, no emission of harmful substances when overheated and ideally, but not necessarily, approved for food contact.

In general, a plastic material can be used as a second layer, and the plastic material can be approved for food contact. However, the second layer can also be made of paper or paper-like materials suitable for exposure to microwave energy.

A function of the microwave susceptible material is to transform microwave energy into heat, which is used to shrink the multilayer material. Therefore, the microwave susceptible material is preferably in good contact with a shrinkable material. This aim is achieved when the microwave susceptible material is, for example, glued onto a heat-shrinkable first layer. In some examples, the microwave susceptible material is embedded between the first and the second layer. The microwave susceptible material can comprise a metal that can be heated up by microwave energy. The metal may be in the form of metal flakes, for example aluminium flakes, such as within a polymer matrix. In some examples, the metal can be a chemically deposited metal on a foil. In other examples, the metal can be directly deposited onto a first layer of the multilayer material. In a preferred embodiment, the microwave susceptible material is provided in the form of an ink, which is, for example, applicable by screen-printing.

To embed the microwave susceptible material between the first and the second layer, the first and second layer can be connected to each other, for example, by a glue in any way known by those skilled in the art.

In some embodiments, the microwave susceptible material is not attached to the second layer of the multilayer material. In these embodiments, an intermediate layer can be attached to a side of the microwave susceptible material adjacent to the second layer in order to prevent contact between the microwave susceptible material and the second layer.

In another embodiment, glue used to connect the first and the second layer is heat-sensitive. In this embodiment, when the microwave susceptible material is heated up by microwave energy, the first layer shrinks and the glue in the area of the microwave susceptible material is also heated up. The heated glue loses its adhesive properties and the connection between the microwave susceptible material and the second layer is lost.

In yet another embodiment, the glue is located substantially in areas without microwave susceptible material.

Generally, the microwave susceptible material does not completely cover a first or a second layer. The microwave susceptible material forms a pattern within the multilayer material. Thus, only parts of the first or second layer which are in an area adjacent to the microwave susceptible material are exposed to heat and consequently shrink. The pattern of the microwave susceptible material may be selected such that it is possible to shrink certain areas of the multilayer material or of the first layer, and, as a result, to create areas of increased stiffness within the multilayer material.

In some embodiments, the microwave susceptible material forms a pattern comprising straight lines having a defined length, and the lines can be arranged substantially parallel to each other within the multilayer material. By using such a pattern, the multilayer material can be stiffened in the direction of the lines of the microwave susceptible material. Since at least the first heat-shrinkable layer is shrunk along the lines of the microwave susceptible material, reinforced areas are therefore formed along the lines similar to a stiffener.

In another embodiment, the microwave susceptible material lines are arranged substantially perpendicular to each other. For example, the pattern of the lines can form a grid. Such a grid pattern can provide higher stiffness of the multilayer material after exposing it to microwave energy.

In yet another embodiment, the microwave susceptible material lines are zigzagged. "Zigzagged" lines, as referred to in this disclosure, typically refer to lines with a zigzag pattern wherein the pattern is sufficiently small that the zigzagged line appears as a straight line in total. Zigzagged lines and straight lines can be arranged parallel or perpendicular relative to adjacent lines. Zigzagged lines and straight lines can be spaced apart or intersecting. Microwave susceptible material arranged in a pattern of zigzagged lines can provide higher stiffness of the multilayer material.

According to a further aspect of the disclosed embodiments, the first layer or the second layer or both layers can be covered by a top layer. The top layer can function to protect the multilayer material against environmental impact and may be optionally removable. For example, the top layer can be removed from the multilayer material prior to microwave energy exposure. The top layer can comprise amorphous polyethylene terephthalate, crystalline polyethylene terephthalate (CPET), or other suitable material like polypropylene, polyethylene, or polyamide.

According to another aspect of the disclosed embodiments, the first layer of the multilayer material can have a high shrinkage coefficient and the second layer can have a shrinkage coefficient that is comparably very low. For example, the second layer can be non-shrinkable. Application of heat to the first layer causes it to shrink while the second layer maintains substantially its original dimensions. In this case, the multilayer material will bend because of the different lengths of first and second layer which can be connected to each other, for example, by a glue. The amount of bending of the multilayer material can be controlled and increased. In an example embodiment, a first layer includes a groove that is at least partially filled with microwave susceptible material, the first layer and the groove being covered by a second layer. Depending on the form or shape of the groove (i.e., v-shaped, u-shaped, etc.) the multilayer material becomes bent along the groove, forming a joint in this area.

In another aspect of the disclosed embodiments, the multilayer material is used for the production of a food bag, which can be used as a serving or administering means for the food after exposure to the microwave energy. The food inside the food bag is not necessarily heated up. By choosing appropriate materials and a suitable pattern of the microwave susceptible material, a short impulse of microwave energy can be sufficient to create a rigid container from a formerly flexible and soft food bag, while the food, for example potato snacks, remains unheated. In this manner, the food bag can be initially flexible, which is advantageous during transport of the food, and then the food bag is formed into a rigid container by microware energy, such as a bowl. Such a rigid container can be useful for serving the food.

In a preferred embodiment, the food bag comprises a base area which is connected circumferentially to a side area by at least one seam weld. The multilayer material of the side wall comprises microwave susceptible material in a pattern of lines which are orientated basically perpendicular to the seam weld. After exposure of the food bag to microwave energy, the multilayer material has stiffened areas along the microwave susceptible material lines which function as stiffeners to keep the food bag in a rigid form while the multilayer material between the stiffeners remains flexible. Alternatively, the areas of increased stiffness may be orientated basically parallel to the seam weld.

The foregoing and other objects, features, and advantages will become more apparent from the following detailed description, which proceeds with reference to the accompanying figures.

DETAILED DESCRIPTION

The relative size of layers and materials shown in the figures are not meant to represent true sizes. Proportional sizes of the details shown in the figures are not intended to represent true proportional sizes. Some dimensions, for example the thickness of the microwave susceptible material, can be significantly smaller than they appear in the figures.

Figure 1:
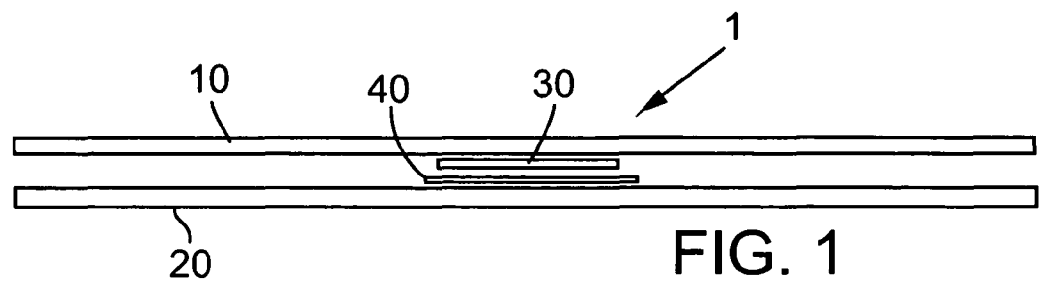
FIG. 1 is a cross-sectional view of a multilayer heat-shrinkable material.

FIG. 1 is a cross-sectional view of a first embodiment of a heat-shrinkable multilayer material 1. Material 1 includes a first layer 10 made of a heat-shrinkable material, for example pre-stretched polyethylene terephthalate. Between the first layer 10 and a second layer 20, a microwave susceptible material 30 is positioned. The thickness of the microwave susceptible material 30 is chosen such that the flexibility of the first layer 10 is not diminished. The second layer 20 may be made of a plastic material which is optionally heat-shrinkable. Alternatively, the second layer 20 may be heat-resistant such that minimal shrinkage occurs when exposed to heat (as long as the temperature remains below the melting or decomposition temperature of the material).

The first layer 10 and the second layer 20 can be glued together, enclosing the microwave susceptible material 30 between them. Once the multilayer material 1 is exposed to microwave energy, the microwave susceptible material 30 is heated up and the first 10 and the second layer 20 are therefore heated up as well in the contact area with the microwave susceptible material 30.

In some examples, shrinkage of the second layer 20 may be undesirable, such as when this layer may restrict the shrinkage of the first layer 10 in the contact areas with the microwave susceptible material 30. In these examples, the second layer 20 can be made of a non-shrinkable material. Given that the first layer 10 shrinks during heating of the microwave susceptible material 30 by microwave energy and the second layer 20 does not, the second layer 20 is preferably not in contact with the first layer 10 or with the microwave susceptible material 30 in those areas where the first layer 10 shrinks. Otherwise, the second layer 20 could be affected and shrunk as well because of the shrinkage of the first layer 10. Thus, in a preferred embodiment, the second layer 20 is separated from the microwave susceptible material 30 and from the first layer 10 (in the area of the microwave susceptible material 30) by an intermediate layer 40, for example with anti-adhesive properties.

Figure 2A:
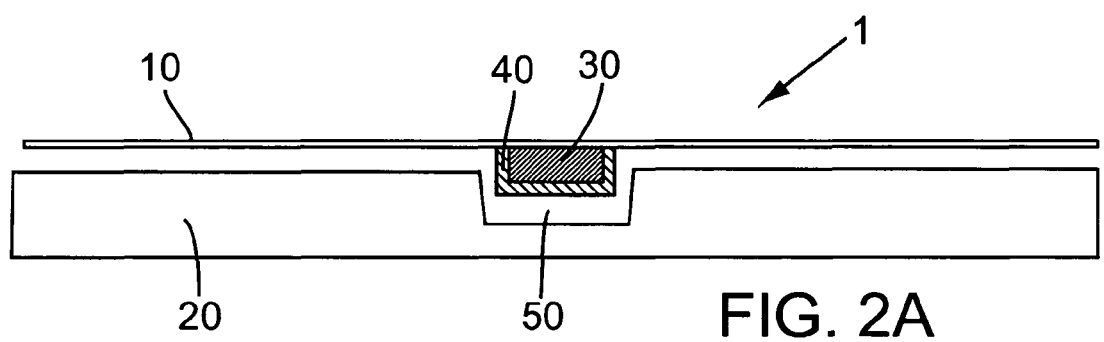
FIG. 2A is a cross-sectional view of a multilayer heat-shrinkable material with a groove.
Figure 2B:
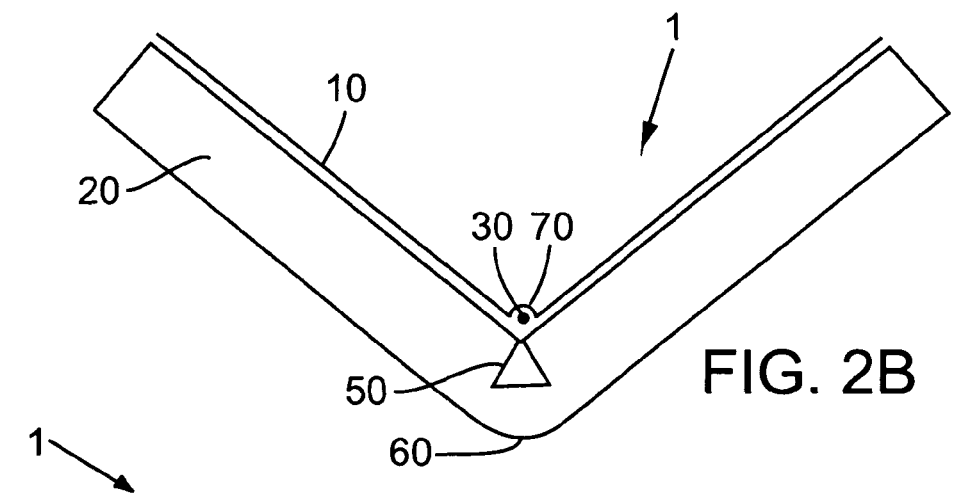
FIG. 2B is a cross-sectional view of the multilayer heat-shrinkable material of FIG. 2A after exposure to microwave energy showing that the material has been bent into an angled shape.

FIGS. 2A and 2B are cross-sectional views of another embodiment of the multilayer material 1 before and after exposure to microwave energy, respectively, wherein the first layer 10 is a heat-shrinkable material. As shown in FIG. 2A, a small area of the first layer 10 is covered by a microwave susceptible material 30 which is covered by an anti-adhesive material 40. The second layer 20 is made of a non-shrinkable material and comprises a groove 50 adjacent to the microwave susceptible material 30.

FIG. 2B is a cross-sectional view of the multilayer material 1 of FIG. 2A after microwave energy is applied to the multilayer material 1. The application of microwave energy is preferably carried out by placing the multilayer material 1 in a microwave oven for several seconds. Because heat is transferred from the microwave susceptible material 30 to the first layer 10, the first layer 10 shrinks and consequently is reduced in length and width, while dimensions of the second layer 20 can remain substantially unchanged. Since the second layer 20 is attached to the first layer 10 such as by means of a glue in areas where the first layer 10 remains unshrunk, the second layer 20 and therefore the multilayer material 1 bend and form a joint 60. As the multilayer material 1 bends, the shape of the groove 50 can change from a basically rectangular profile to a triangular one. In general, the second layer 20 can be fractionally stretched in the area of the joint 60, while the first layer 10 can have an overhang of material 70 in this area.

Figure 2C:
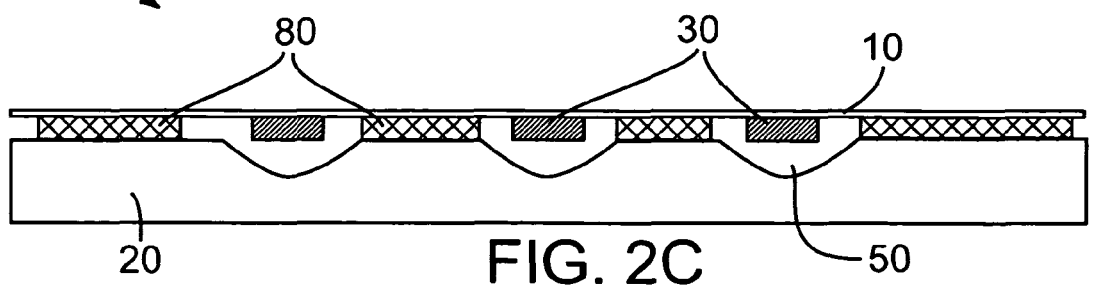
FIG. 2C is a cross-sectional view of a multilayer heat-shrinkable material with multiple grooves.

To create a curved bend in the multilayer material 1, a number of U-shaped grooves 50 can be arranged parallel to each other in the second layer 20. FIG. 2C is a cross-sectional view of such an embodiment of the multilayer material. In this embodiment, microwave susceptible material 30 is positioned in front of grooves 50 onto the first layer 10. In this embodiment, portions of the layer 10 are connected to portions of the layer 20 by a glue layer 80.

Figure 3:
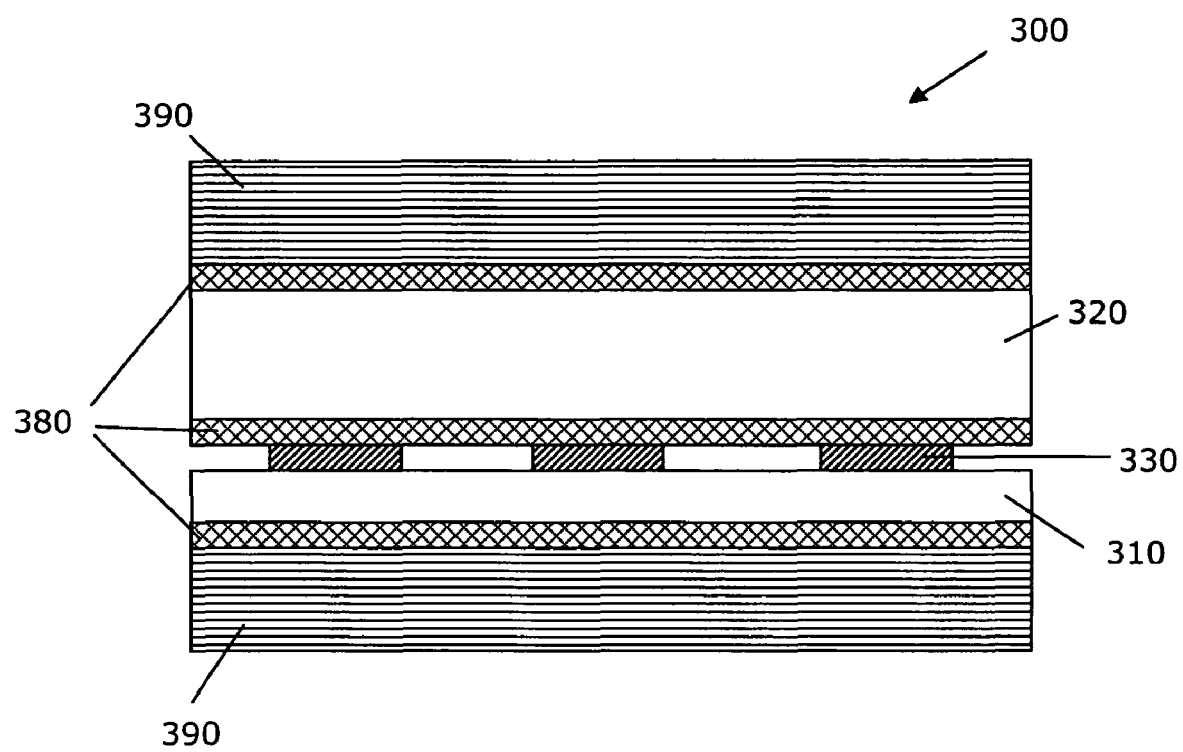
FIG. 3 is a cross-sectional view of a multilayer heat-shrinkable material with additional top layers.

FIG. 3 shows a cross-sectional view an embodiment of a multilayer material 300, wherein a first layer 310 and a second layer 320 are each covered by a top layer 390. Top layers 390 are connected to the first layer 310 and to the second layer 320 by means of a glue layer 380, while microwave susceptible material 330 is positioned in contact with the first layer 310. The top layer 390 connected to the first layer 310 and the top layer 390 connected to the second layer 320 can be made of the same material or of different materials. Depending on the intended use for the multilayer material 300, a top layer 390 may be covered by a silicon oxide layer (not shown). The first layer 310 and the connected top layer 390 can be replaced by a shrinkable co-extruded material made of polypropylene and polyethylene. The material 300 is preferably used in the production of food bags, wherein the top layer 390 connected to the first layer 310 forms an inside surface of a food bag and, generally, is in direct contact with food in the food bag.

Figure 4A:
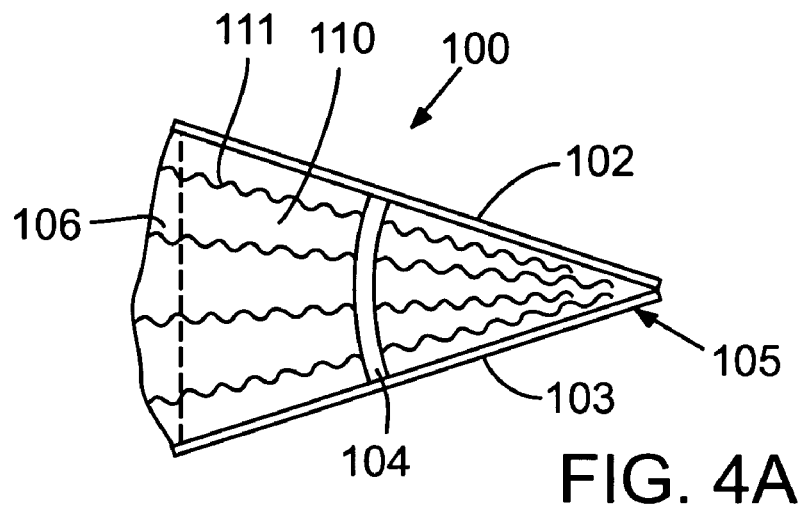
FIG. 4A is a side perspective view of a food bag made of a multilayer heat-shrinkable material in a closed condition.
Figure 4B:
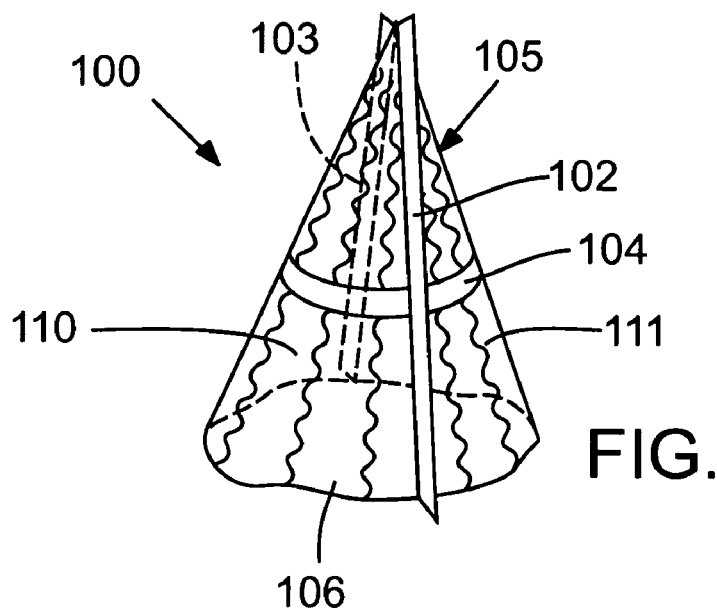
FIG. 4B is a perspective view of the food bag of FIG. 4A in a closed condition.

FIG. 4A shows a side perspective view of a preferred embodiment of a food bag 100 such as a food bag for potato snacks. The food bag 100 is made of a heat-shrinkable multilayer material 1, according to embodiments disclosed herein. The food bag 100 has a base area 106 of essentially elliptical shape and sidewalls 110 extending from the base area 106 and meeting at their opposite ends, thus forming a generally conical shape (FIG. 4B). The base area 106 is folded along its centreline and the sidewalls 110 are situated basically parallel to the base area 106 prior to the microwave energy treatment of the food bag 100. The sidewalls 110 are closed by seam welds 102, 103 projecting outwardly from the sidewalls. The multilayer material 1 of the sidewalls 110 can have spaced apart zigzagged lines 111 of microwave susceptible material 30 arranged as shown, which are approximately parallel to the seam welds 102, 103 after exposure to microwave energy (FIG. 4C).

Once the food bag 100 has been exposed to microwave energy, for example in a microwave oven, the sidewalls 110 develop stiffened areas along the zigzagged lines 111, and the food bag 100 can stand on its base area 106 as shown in FIG. 4B. The sidewalls 110 include a means 104 suitable to open the food bag 100 and to remove completely or in part a top piece 105 of the food bag 100 which also has a generally conical form in the presented embodiment. The top piece may have any suitable form known in the art. The opening means 104 may be a kind of zip fastening or other opening systems well known in the art.

Figure 4C:
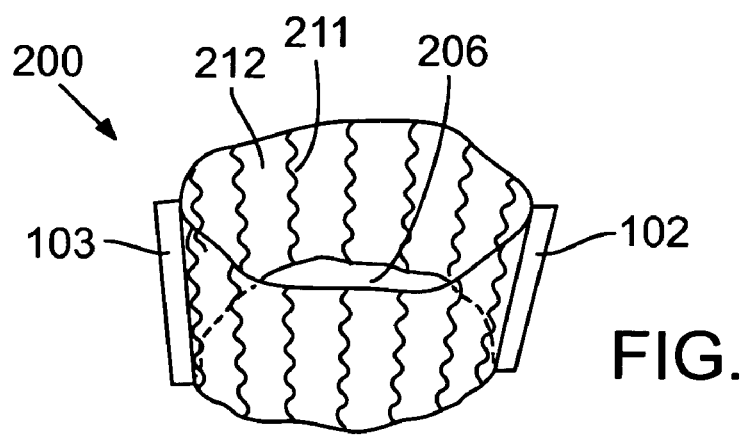
FIG. 4C is a perspective view of the food bag of FIGS. 4A and 4B after exposure to microwave energy and in an open condition with the top portion removed.

After actuating the opening means 104 and removing the top piece 105 of the food bag 100, a container 200 as shown in FIG. 4C is obtained. The sidewalls 110 consist of stiffened areas 211 and flexible wall elements 212 located in between the stiffened areas 211. The stiffened areas 211 determine the stability of the container 200. In general, the container 200 can be sufficiently stable to allow the food item (not shown) within the original flexible food bag 100 to be served. Optionally, the base area 206 of the container 200 can include additional stiffened areas to add stability to the food container 200.

It should be understood that the shape of the food bag and the pattern or arrangement of the microwave susceptible material within the multilayer material of the food bag may vary greatly while remaining within the scope of the disclosed embodiments. The food bag appearing in FIGS. 4A-4C is a representative example and does not limit the scope of the disclosure. The disclosed embodiments can include any other food bag shapes known in the art and the arrangement of microwave susceptible material within the multilayer material of the food bag may vary depending on these other food bag shapes.

In addition, use of the disclosed multilayer material is not limited to packaging of food. Embodiments of the multilayer material disclosed herein may be utilized for packaging in general. The disclosed multilayer material can be especially useful in packaging applications where the conversion of flexible packaging material into at least partially rigid packaging material (i.e. with stiffened areas) is desirable.

In view of the many possible embodiments to which the principles of the disclosure may be applied, it should be recognized that the illustrated embodiments are only preferred examples and should not be taken as limiting in scope. Rather, the scope is defined by the following claims. We therefore claim all that comes within the scope and spirit of these claims.

We claim:

1. A heat-shrinkable multilayer material for packaging, comprising:
    a first layer made of heat-shrinkable material;
    a layer of microwave susceptible material partially covering the first layer and defining a shrinkable area of the first layer;
    an intermediate layer having an intermediate layer area larger than the shrinkable area, the intermediate layer covering the microwave susceptible material and extending beyond the shrinkable area;
    a second layer made of non-shrinkable material and covering the intermediate layer;
    wherein the microwave susceptible material is arranged in a pattern between the first layer and the intermediate layer, the pattern creating areas of increased stiffness after microware energy is applied to the microwave susceptible material, and the first layer and the second layer are connectible to each other outside a periphery of the intermediate layer and not connectible to each other where separated by the intermediate layer.

2. The heat-shrinkable multilayer material according to claim 1, wherein the microwave susceptible material is embedded in the first layer.

3. The heat-shrinkable multilayer material according to claim 1, wherein at least one of the first layer and the second layer is sealable.

4. The heat-shrinkable multilayer material according to claim 1, wherein at least one of the first layer and the second layer is made of polyethylene terephthalate.

5. The heat-shrinkable multilayer material according to claim 1, wherein at least one of the first layer and the second layer is made of polypropylene or of polypropylene/polyethylene co-extruded material.

6. The heat-shrinkable multilayer material according to claim 1, wherein at least one of the first layer and the second layer is made of paper or paper-like material.

7. The heat-shrinkable multilayer material according to claim 1, wherein the microwave susceptible material comprises a metal.

8. The heat-shrinkable multilayer material according to claim 1, wherein the microwave susceptible material comprises an ink.

9. The heat-shrinkable multilayer material according to claim 1, wherein at least a portion of the first layer is connected to at least a portion of the second layer by a glue.

10. The heat-shrinkable multilayer material according to claim 9, wherein the glue is heat sensitive.

11. The heat-shrinkable multilayer material according to claim 9, wherein an area where the first layer is connected to the second layer by the glue is outside of the shrinkable area.

12. The heat-shrinkable multilayer material according to claim 1, wherein the pattern of the microwave susceptible material comprises a plurality of spaced apart substantially straight lines.

13. The heat-shrinkable multilayer material according to claim 1, wherein the pattern of the microwave susceptible material comprises a plurality of spaced apart zigzagged lines.

14. The heat-shrinkable multilayer material according to claim 1, wherein the pattern of the microwave susceptible material comprises a plurality of generally straight lines arranged to define axes that intersect each other.

15. The heat-shrinkable multilayer material according to claim 1, further comprising a top layer covering at least one of the first layer and the second layer.

16. The heat-shrinkable multilayer material according to claim 15, wherein the top layer is made of crystalline polyethylene terephthalate, polypropylene, polyethylene, or polyamide.

17. The heat-shrinkable multilayer material according to claim 1, wherein the first layer comprises at least one groove filled at least partially with the microwave susceptible material, the first layer and the second layer bending to form a joint along the groove as a result of application of microwave energy.

18. A food bag comprising a flexible material in a form of a bag, the flexible material, comprising:
    a first layer made of flexible heat-shrinkable material;
    a microwave susceptible material covering part of the first layer and defining a shrinkable area of the first layer;
    an intermediate layer having an intermediate layer area greater than the shrinkable area, the intermediate layer covering and extending beyond the shrinkable area;
    a second layer made non-shrinkable material and covering the intermediate layer;
    wherein the microwave susceptible material is arranged in a pattern between the first layer and the intermediate layer, the pattern creating areas of increased stiffness after microwave energy is applied such that the first layer becomes stiffer, and the first layer and the second layer are connectible to each other outside a periphery of the intermediate layer and not connectible to each other where separated by the intermediate layer.

19. The food bag according to claim 18, wherein the flexible material forms a base area and at least one side area connected circumferentially to the base area by at least one seam weld after the microwave energy is applied, wherein the areas of increased stiffness are oriented substantially perpendicular to the at least one seam weld.

20. The food bag according to claim 18, wherein the flexible material forms a base area and at least one side area connected circumferentially to the base area by at least one seam weld after the microwave energy is applied, wherein the areas of increased stiffness are oriented substantially parallel to the at least one seam weld.

21. The food bag according to claim 18, wherein the form of the bag is generally conical with a removable top portion and a bottom portion that forms a serving dish after the microwave energy is applied.

22. A method of making a heat-shrinkable multilayer material, comprising providing a first layer made of heat-shrinkable material and a second layer made of non-shrinkable material;
    patterning a portion of the first layer with a microwave susceptible material, the patterned microwave susceptible material capable of creating areas of increased stiffness as a result of applying microwave energy to the microwave susceptible material;

providing an intermediate layer that covers and extends beyond the microwave susceptible material;

aligning the first layer and the second layer such that the patterned microwave susceptible material and the intermediate layer are positioned between the first layer and the second layer and connecting the first layer and the second layer together in an area surrounding the intermediate layer.

23. The method according to claim 22, further comprising: covering at least one of the first and the second layer with a top layer.

24. The method according to claim 22, further comprising: forming the connected first layer and second layer into a bag.

* * * * *